United States Patent
Strassenberger

(10) Patent No.: US 8,377,295 B2
(45) Date of Patent: Feb. 19, 2013

(54) COMBINATION FILTER ARRANGEMENT

(75) Inventor: Norbert Strassenberger, Adlkofen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 440 days.

(21) Appl. No.: 12/672,087

(22) PCT Filed: Aug. 6, 2008

(86) PCT No.: PCT/EP2008/060321
§ 371 (c)(1),
(2), (4) Date: Feb. 18, 2010

(87) PCT Pub. No.: WO2009/019283
PCT Pub. Date: Feb. 12, 2009

(65) Prior Publication Data
US 2011/0210053 A1    Sep. 1, 2011

(51) Int. Cl.
*B01D 35/18* (2006.01)
(52) U.S. Cl. ......... 210/186; 210/184; 210/446; 210/774
(58) Field of Classification Search .................. None
See application file for complete search history.

(56) References Cited

U.S. PATENT DOCUMENTS

| | | | | | |
|---|---|---|---|---|---|
| 1,900,821 | A | * | 3/1933 | Kline | 210/133 |
| 2,178,930 | A | * | 11/1939 | Crawford | 210/186 |
| 2,331,482 | A | * | 10/1943 | Lamb | 210/186 |
| 2,730,083 | A | * | 1/1956 | Kremser | 123/41.33 |
| 3,762,467 | A | * | 10/1973 | Poon et al. | 165/163 |
| 4,146,485 | A | * | 3/1979 | Broad | 210/416.1 |
| 4,372,260 | A | * | 2/1983 | Baker | 123/142.5 E |
| 4,442,819 | A | * | 4/1984 | Veach | 123/557 |
| 4,498,446 | A | * | 2/1985 | Judson | 123/557 |
| 4,603,244 | A | * | 7/1986 | Genz | 219/205 |
| 4,878,536 | A | * | 11/1989 | Stenlund | 165/119 |
| 4,933,093 | A | * | 6/1990 | Keller | 210/774 |
| 5,095,971 | A | * | 3/1992 | Hehl | 165/47 |
| 5,143,149 | A | * | 9/1992 | Kronberg | 165/300 |
| 5,326,461 | A | * | 7/1994 | Legrand et al. | 210/186 |
| 5,476,139 | A | * | 12/1995 | Gire | 165/119 |
| 5,967,111 | A | * | 10/1999 | Hedman | 123/196 A |
| 6,035,930 | A | * | 3/2000 | Schwartz | 165/169 |

(Continued)

FOREIGN PATENT DOCUMENTS

| | | |
|---|---|---|
| DE | 3317008 | 11/1984 |
| DE | WO9949188 | 9/1999 |

(Continued)

OTHER PUBLICATIONS

German patent office search for priority application. PCT search report of PCT parent application.

*Primary Examiner* — Robert James Popovics
(74) *Attorney, Agent, or Firm* — James Hasselbeck

(57) ABSTRACT

The invention relates to a combination filter arrangement (1) having a hollow cylindrical filter element (2) for filtering a first fluid medium, having a temperature compensation medium separated by means of cylindrical separating wall (5), as a second fluid medium in an area between the separating wall (5) and an outer housing (9) of the combination filter arrangement (1). The first fluid medium is made of a urea-water mixture, or comprises a urea-water additive having a higher freezing temperature than the first and the second fluid medium, and at least the separating wall (5) has an elasticity such that the volume expansion by freezing the urea-water additive can be absorbed.

6 Claims, 2 Drawing Sheets

U.S. PATENT DOCUMENTS

| | | | | |
|---|---|---|---|---|
| 6,105,664 | A * | 8/2000 | Gillbrand et al. | 165/119 |
| 6,155,336 | A * | 12/2000 | Schwartz | 165/47 |
| 6,206,090 | B1 * | 3/2001 | Rago | 165/119 |
| 6,746,600 | B2 * | 6/2004 | Nguyen | 210/167.06 |
| 6,994,784 | B2 * | 2/2006 | Jainek | 210/149 |
| 7,156,239 | B2 * | 1/2007 | Klotz et al. | 210/435 |
| 7,396,473 | B1 * | 7/2008 | Guynn | 210/774 |
| 7,479,219 | B2 * | 1/2009 | Rassinger | 210/130 |
| 7,481,319 | B2 * | 1/2009 | Jokschas et al. | 210/349 |
| 7,594,516 | B2 * | 9/2009 | Maisch et al. | 137/240 |
| 7,992,667 | B2 * | 8/2011 | Rennie | 180/219 |
| 8,038,872 | B2 * | 10/2011 | Jokschas et al. | 210/86 |
| 8,057,687 | B2 * | 11/2011 | Jainek | 210/767 |
| 8,074,673 | B2 * | 12/2011 | Maisch et al. | 137/240 |
| 8,114,278 | B2 * | 2/2012 | Lorente et al. | 210/188 |
| 8,231,779 | B2 * | 7/2012 | Jokschas et al. | 210/86 |
| 2003/0209482 | A1 * | 11/2003 | Klotz et al. | 210/435 |
| 2004/0182566 | A1 * | 9/2004 | Jainek | 165/300 |
| 2005/0077230 | A1 * | 4/2005 | Jokschas et al. | 210/446 |
| 2011/0210053 | A1 * | 9/2011 | Strassenberger | 210/184 |

FOREIGN PATENT DOCUMENTS

| | | |
|---|---|---|
| DE | 10220672 A1 | 11/2003 |
| DE | 10340123 A1 | 3/2005 |
| DE | 202006007960 | 8/2006 |
| EP | 1360983 | 11/2003 |

* cited by examiner

COMBINATION FILTER ARRANGEMENT

CROSS REFERENCE TO RELATED APPLICATIONS

This application is US National Stage Entry of international patent application no. PCT/EP2008/060321, filed Aug. 6, 2008 designating the United States of America, the entire disclosure of which is incorporated herein by reference. Priority is claimed based on Federal Republic of Germany patent application no. 20 2007 010 956.3, filed Oct. 7, 2007.

TECHNICAL FIELD

The invention is based on a combination filter arrangement for filtering liquids with a preferably hollow-cylindrical filter element and a second liquid medium that flows about the filter element by means of a partition, also cylindrical, in accordance with the features of the independent claim.

For example, DE 3874727 T 25.08.1988 discloses that a hollow-cylindrical filter element for filtration of oil of an internal combustion engine is arranged in a first cylindrical housing that serves as a partition relative to a heat exchanger that guides the second liquid medium, for example, cooling water with an anti-freeze additive, externally about the first housing. This heat exchanger, in turn, is limited externally by the housing of the entire combination filter arrangement.

It is therefore disclosed that, in addition to filtration of the oil, also cooling of the oil by means of the known heat exchanger can be realized and, when considered alone, based on this arrangement it is also known that the partition and the external wall of the housing of the filter arrangement interact in such a way that the forces that are generated by the pressures existing in the two media can be compensated.

When employing such a combination filter arrangement in connection with a liquid to be filtered that contains urea additives (so-called Adblue comprised of a urea-water solution), there are, however, other problems as a result of such an additive freezing in the range of approximately −10 degrees C. and causing a volume expansion that has a negative effect on the mechanical structure of the combination filter arrangement.

For example, it is also disclosed in JP 55054619 A2, when considered alone, that the second medium that, in operation of an internal combustion engine, has the function of a heat exchanger makes utilizable the higher temperature relative to the oil to be filtered for an immediate heating of the oil in such a combination filter arrangement in case of cold start of the internal combustion engine.

SUMMARY OF THE INVENTION

The invention concerns a combination filter arrangement of the aforementioned kind with a hollow-cylindrical filter element for filtration of a first liquid medium and with a temperature compensation medium as a second liquid medium that is separated by a cylindrical partition in an area between the partition and the external housing of the combination filter arrangement. According to the invention, the first liquid medium is comprised of an urea-water mixture or it has added to it a urea-water mixture that has a higher freezing temperature than the first and the second liquid media and in that at least the partition has such an elasticity that the volume expansion of the first medium as a result of freezing of the urea-water additive can be compensated in an advantageous manner.

Such a volume expansion would otherwise in general cause destruction of the filter element or even destruction of the entire filter arrangement.

The urea-water additive, for example, is composed such that it freezes in the range of approximately −10 degrees C. wherein the partition and/or the exterior housing can be advantageously produced of an elastomer by means of which the mechanical elasticity upon volume expansion can be ensured. In this connection it is also possible that the exterior housing is made from aluminum.

An especially advantageous application of the invention results for an oil filter of a motor vehicle in which the first medium contains the oil of an internal combustion engine and the second medium is the cooling water of the internal combustion engine to which is added an antifreeze agent.

In an embodiment according to the invention the combination filter arrangement can be provided, in addition to the two connectors for the inlet and outlet of the first medium, with two extra connectors by means of which the cooling water of the cooling circulation of the internal combustion engine can be passed through in order to heat or thaw the first medium and the actual filter element.

The second medium that is thus contained in a mechanically flexible envelope and that, because of the presence of the antifreeze additives, cannot freeze can therefore compensate the volume expansion upon freezing of the urea-water additive in the first medium so that it also acts in combination with the elastic walls as a flexible membrane that counteracts a destruction of the combination filter arrangement upon freezing.

BRIEF DESCRIPTION OF THE FIGURES OF THE DRAWINGS

One embodiment of the invention will be explained with the aid of the drawings. It is shown in.

WAY(S) TO EMBODY THE INVENTION

Figure 1:
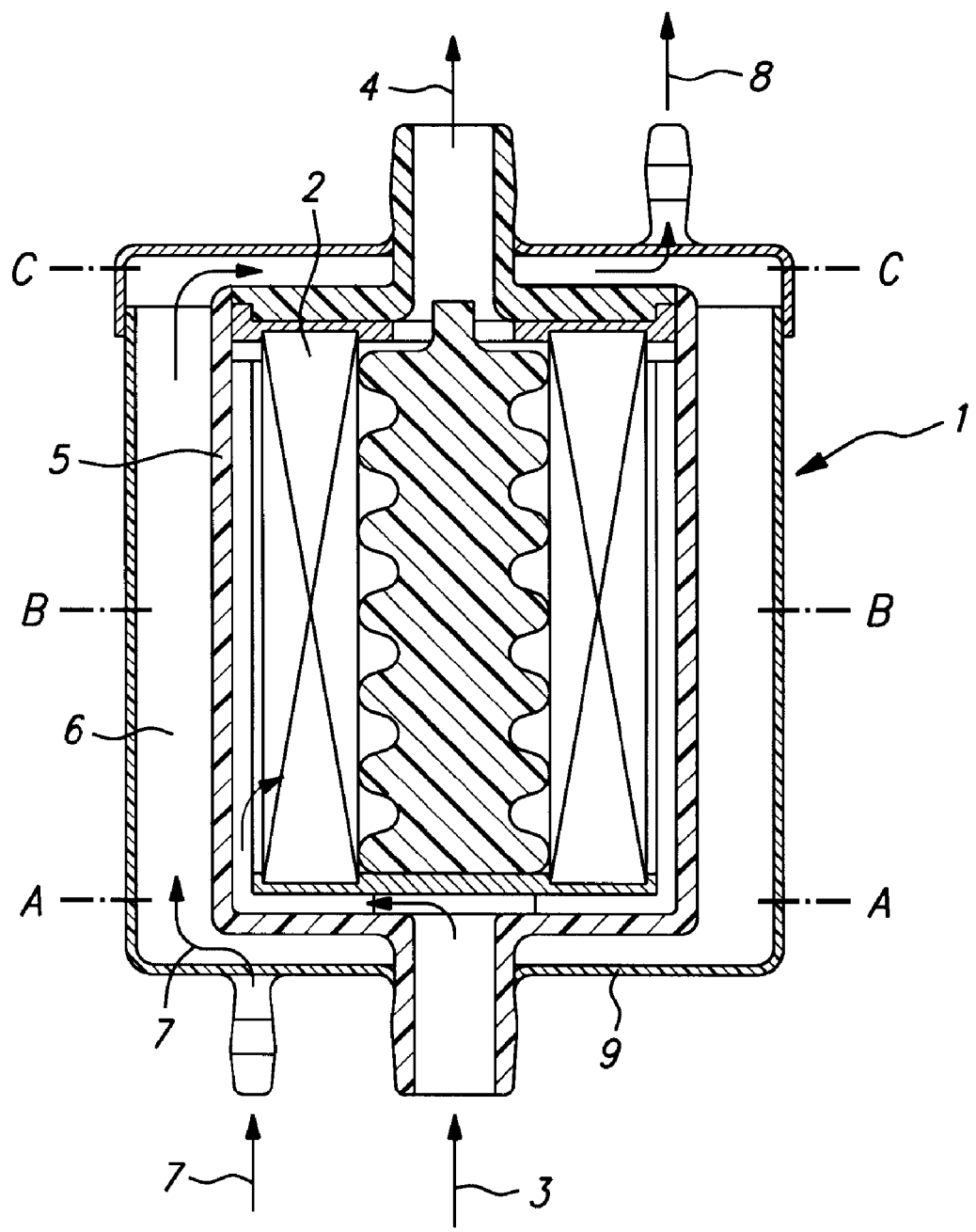
FIG. 1 a section of one embodiment of a combination filter arrangement with an oil filter for an internal combustion engine and an additional cooling water circuit.
Figure 2:
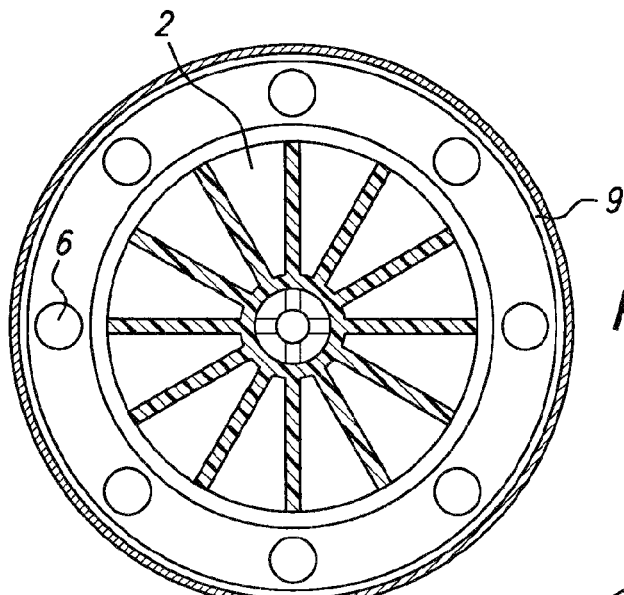
FIG. 2 a section C-C of the combination filter arrangement according to FIG. 1.
Figure 3:
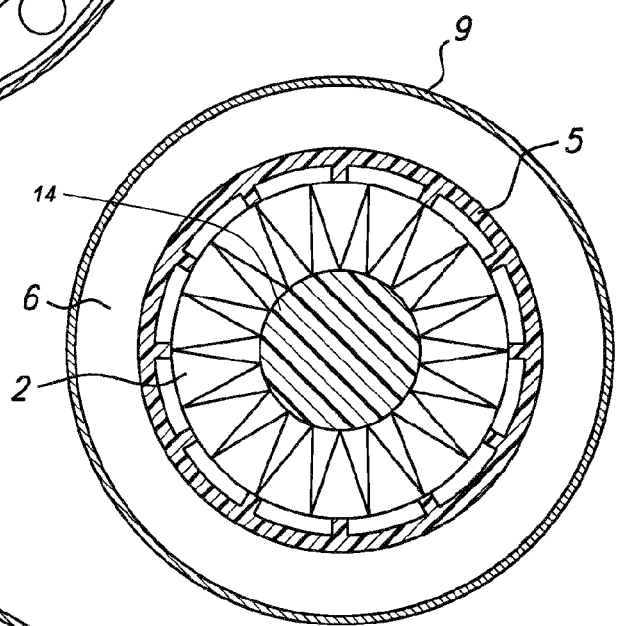
FIG. 3 a section B-B of the combination filter arrangement according to FIG. 1.

In FIG. 1 a configuration of a combination filter arrangement 1 with a hollow cylindrical filter element 2 as an oil filter for an internal combustion engine and an additional cooling water circuit is illustrated wherein this configuration in the following will be explained also with the aid of individual sections of the FIG. 1 in accordance with FIGS. 2 to 4.

The hollow-cylindrical filter element 2 for filtration of a first liquid medium that contains an urea-water mixture is being supplied by an inlet according to arrow 3 and by an outlet according to arrow 4. This area is delimited by a cylindrical partition (also referred to herein as cylindrical partition member) 5 relative to an external area (also referred to herein as thermal compensation medium volume) 6 through which passes according to arrows 7 (inlet) and 8 (outlet) a temperature compensation medium as a second liquid medium, in this embodiment cooling water of an internal combustion engine to which is added an antifreeze agent. The area 6 is outwardly limited by housing 9.

In the filter element 2, the first liquid medium of a urea-water mixture or the oil that is provided with a urea-water mixture has a higher freezing temperature than the first and the second liquid medium in the area 6 so that upon freezing of the urea-water additive a volume expansion will result in the first medium that can be compensated in that at least the partition 5 has an appropriate elasticity and acts as a membrane together with the second liquid medium, here the cooling water containing the antifreeze agent that does not freeze.

Figure 4:
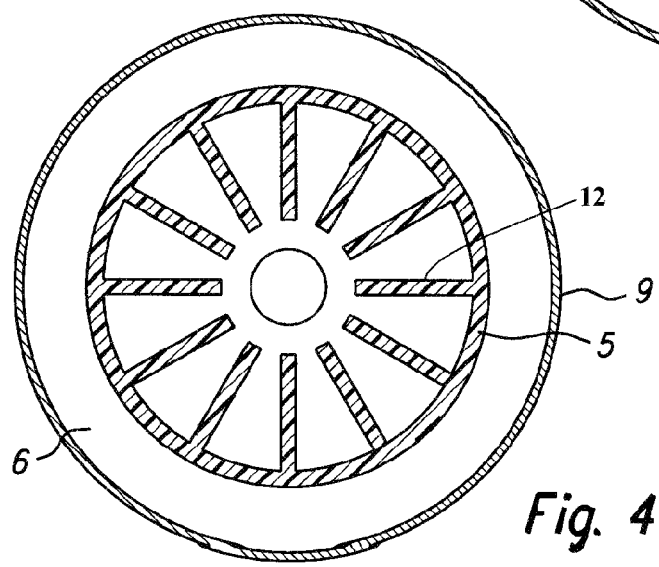
FIG. 4 a section A-A of the combination filter arrangement according to FIG. 1.

In FIG. 4, a combination filter arrangement with a cylindrical partition 5 is shown from which stays 12 are branching off. Partition 5 and stays 12 can be separate components. The stays that form the central body 14 can also be connected to the partition 5. As shown in FIG. 1 and shown in FIG. 3 (section B-B of FIG. 1), the central body 14 is arranged in the interior of the hollow cylindrical filter element 2. The central body 14 may be produced from an elastomer.

The invention claimed is:

1. A combination filter arrangement comprising:
    an external housing including:
        a thermal compensation medium inlet connection;
        a thermal compensation medium outlet connection;
    a hollow cylindrical filter element arranged within said housing filtering a first fluid medium;
    a central body arranged within hollow interior of said hollow cylindrical filter element, said central body produced from an elastomer;
    a cylindrical partition member arranged in said external housing and enclosing said filter element, said cylindrical partition spaced apart inwardly from said external housing defining a thermal compensation medium volume between said external housing and said cylindrical partition, said cylindrical partition including:
        a first fluid inlet connection supplying a first fluid medium having a urea-water mixture to said filter element;
        a first fluid outlet connection conducting said first fluid medium from said filter element;
        wherein said first fluid inlet and first fluid outlet connections each extend outwards from said partition member through said external housing and have a bore therethrough in communication with said thermal compensation medium volume, said thermal compensation medium inlet and outlet cooperatively operative to flow a thermal compensation medium through said thermal compensation medium volume;
    wherein said first fluid medium includes a urea-water additive, said first fluid medium having a higher freezing point temperature than said thermal compensation medium;
    wherein at least a portion of said partition member is sufficiently elastic to permit freezing of said urea-water additive to be compensated without damaging said filter element or said filter arrangement;
    wherein said partition member is produced from an elastomer;
    wherein said thermal compensation medium flowing through said thermal compensation medium volume is operable to heat or thaw said first fluid medium and said cylindrical filter element.

2. The combination filter arrangement according to claim 1, wherein said urea-water additive is composed such that it freezes in a range of −10 degrees C.

3. The combination filter arrangement according to claim 2, wherein the external housing is produced from an elastomer.

4. The combination filter arrangement according to claim 1, wherein the external housing comprises an aluminum or a thermoplastic synthetic material.

5. The combination filter arrangement according to claim 1, wherein said first fluid medium contains the oil of an internal combustion engine and said thermal compensation medium is cooling water of the internal combustion engine that also includes an antifreeze agent.

6. The combination filter arrangement according to claim 1, wherein said first fluid inlet and first fluid outlet are secured to opposing ends of said partition member and are aligned axially with said cylindrical filter element.

* * * * *